June 30, 1970  J. K. BERTRAMS  3,518,417
FLASH-LAMP HOLDER
Filed Jan. 19 1967  2 Sheets-Sheet 2
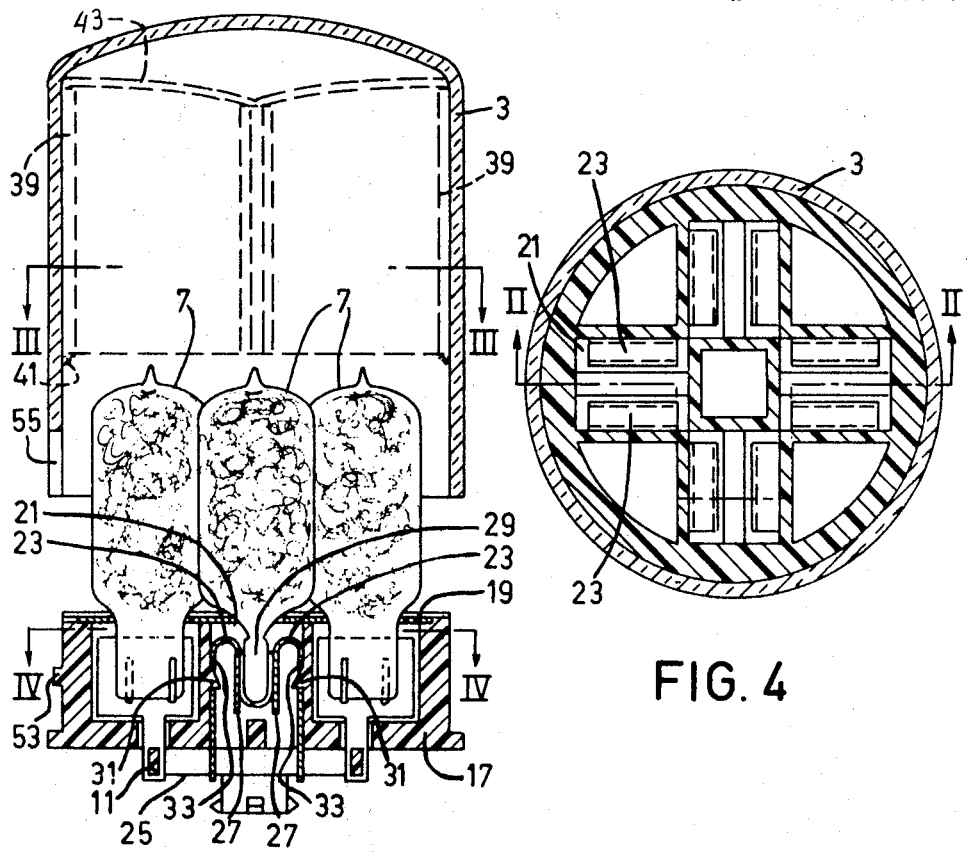
FIG. 2
FIG. 4
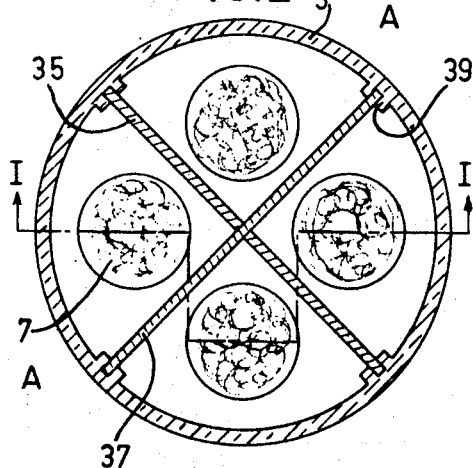
FIG. 3
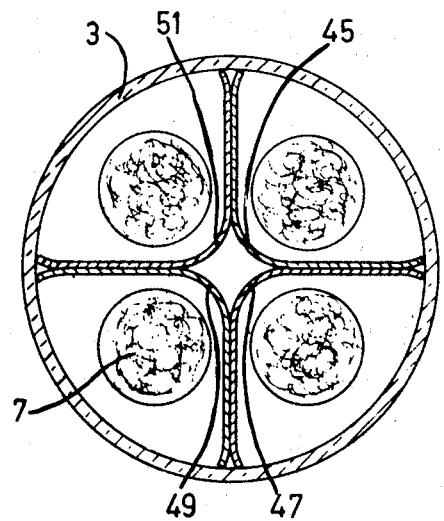
FIG. 5
INVENTOR.
JOHANNES K. BERTRAMS
BY
Frank R. Trifari
AGENT United States Patent Office 3,518,417,
Patented June 30, 1970

3,518,417
FLASH-LAMP HOLDER
Johannes Kurt Bertrams, Hilden, Germany, assignor, by mesne assignments, to U.S. Philips Corporation, New York, N.Y., a corporation of Delaware
Filed Jan. 19, 1967, Ser. No. 610,413
Claims priority, application Netherlands, Jan. 21, 1966, 6600784
Int. Cl. G03b 15/02
U.S. Cl. 240—1.3
3 Claims

ABSTRACT OF THE DISCLOSURE

A flash-lamp holder for attachment to a camera and for holding a plurality of flash lamps which are successively ignited. The base of the holder has spaced recesses into which the lamps are insertable, and the removable cover of the holder has panels fixed therein to define chambers, each chamber having reflective outer surfaces and situated about a lamp.

---

The invention relates to a combination of a flashholder which can be rotatably secured to a camera or a camera auxiliary member and a number of flash lamps. The holder comprises a bottom portion having an upper side on which a number of systems are provided, each constituted by a reflector and a flash lamp. The bottom portion of the holder comprises on its lower side a central member for securing the holder to a camera and a number of sets of current conducting contacts arranged around said member, one set per flash lamp, and these sets can be connected to a set of flash contacts of the camera only one after the other. The holder further comprises a cover at least the side surfaces of which consist of a transparent material, this cover enveloping the parts of the holder arranged above the bottom portion and the space to be occupied by the flash lamps. Such a combination is known.

The known combination is constructed as a cubical unit which can be secured to the upper side of a camera. Such a camera is constructed so that, for example, by operating the shutter mechanism, the unit in question is rotated a quarter turn automatically and rapidly, so that a subsequent lamp can assume the position for flashing.

After the four flash lamps have been fired, the unit cannot be used again and is thrown away. The part of the holder of the known unit to be discarded is comparatively costly; it should comprise a bottom portion, four reflectors, and a transparent, cubical cover, which components are further useless.

It is the object of the present invention to provide a combination which is suitable for use in a similar camera as described above, and which maintains the flash qualities of the known combination, with the additional possibility presented of replacing the fired flash lamps by new ones and consequently using again the holder of the combination.

The combination according to the invention is characterized in that the bottom portion comprises a number of recesses, and in each is disposed a set of resilient clamping contacts which are connected to the current conducting contacts, which then touch the current conductors projecting from the flash lamp inserted from above in said recesses and the clamping contacts. The cover in which the reflectors are arranged is detachably secured to the bottom portion. In this combination the reflectors are arranged in the cover and are formed integral therewith. After the flash lamps have been fired, it is necessary only to detach the cover from the bottom portion after which the fired lamps can easily be pulled out of the clamping contacts of the bottom portion and be replaced by new ones.

The invention also relates to a holder which is particularly suitable for use in a combination as described above and which is characterized in that the bottom portion of said holder comprises a number of recesses; in each recess is disposed a set of resilient clamping contacts which are connected to the current conducting contacts, which then touch the current conductors projecting from the flash lamp to be inserted from above into said recesses and clamping contacts, the reflectors being arranged in the detachably secured cover.

According to an embodiment of that holder, each set of resilient clamping contacts and the associated set of current conducting contacts is constituted as a common set of resilient lugs. At their ends facing the reflectors, the lugs are bent towards each other in such manner that the current conductors projecting from the base of a flash lamp to be inserted from above can be clamped in a resilient manner between the parts facing one another of the ends of the lugs. To lock the lugs in the direction of their height each lug extends, through part of its length, flat against a wall part of the associated recess in the bottom portion, the wall part comprising a barb-like projection which hooks behind a recess in the part of the lug in question.

In order that the invention may be readily carried into effect it will now be described in greater detail, by way of example, with reference to the accompanying drawings, in which:

FIG. 2 is a longitudinal cross-sectional view taken on the lines I—I and II—II of FIGS. 3 and 4, respectively, of the same holder in a position in which the bottom portion and the cover comprising the reflectors are spaced apart;

FIG. 3 is a cross-sectional view taken on the line III—III of FIG. 2;

FIG. 4 is cross-sectional view taken on the line IV—IV of FIG. 2;

FIG. 5 is a similar cross-sectional view as FIG. 3 of another form of reflectors.

Figure 1:
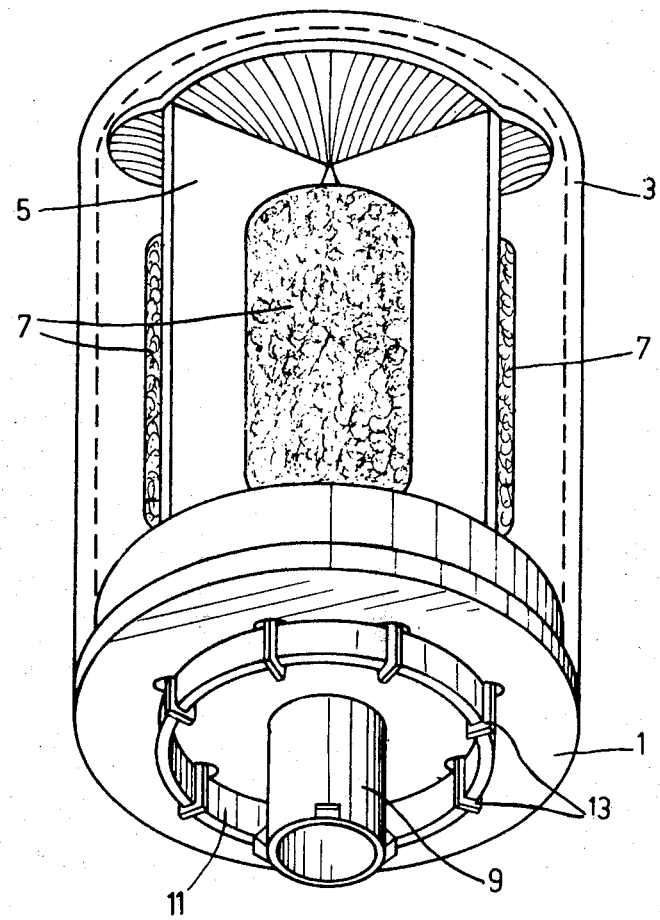
FIG. 1 is a perspective view of a flash holder according to the invention.

The device shown in FIG. 1 can be rotatably secured to a camera not shown, and is formed as a combination of a bottom portion 1, a transparent cover 3 of synthetic material, and a number of systems surrounded by the cover 3, each system consisting of a reflector 5 and a flash lamp 7. The combination can be secured to a camera by means of a star-shaped member 9 in the bottom portion. The collar 11 of the bottom portion 1 comprises a number of current conducting contacts 13 arranged around the member 9. These contacts 13 are connected to the current conductors projecting from the flash lamps. In each position of the device, one pair of these contacts 13 is in contact with a set of flash contacts of the camera. The construction of that camera will not be further described here.

In the combination shown the cover 3, the reflectors 5 and the flash lamps 7 can be removed. FIG. 2 shows the various parts of the combination in which the bottom portion 1 and the cover 3 are shown in a spaced position.

The bottom portion of FIG. 2 (see also FIG. 4) comprises a base 17 compressed from synthetic material and a cover plate 19 secured on top of said base, and a number of recesses 21 each containing a set of clamping contacts which are formed as resilient metal contact lugs 23 and extend along the inner wall of an associated recess 21. Through radial slots in the collar 11 the lugs, after being twisted a bit at their lower ends, project to below the edge 25 of the bottom portion. At their upper ends the two contact lugs 23, arranged in the same recess 21, are bent towards each other. Between the ends 27 facing each other of a set of lugs a flash lamp 7 can be inserted from above with its base 29 in such manner, that the current conductors projecting from the base are clamped between the ends 27 of the contact lugs. Flash lamps can thus be arranged detachably in the bottom portion so that they can be replaced after having been fired. The contact lugs are locked against displacement in the direction of their height, for which purpose the barb-like projection 31 hooks in a recess 33 of an associated contact lug 23.

The cylindrical cover 3 consisting of transparent material is provided with a number of reflector walls secured therein which, in the embodiment shown in FIG. 3, consist of crossed metal parts 35 and 37. These parts are slid in slots 39 and secured in the cover, for example, by a glued joint at 41. In FIG. 2 the reflector walls and the slots of the cover are shown in dotted lines viewed in the direction of the arrows A—A of FIG. 3. The two walls 35 and 37 constitute four reflectors for the four flash lamps 7 to be inserted. On their upper sides said reflectors are bounded by a closed, dome-shaped metal top plate 43 having a reflecting action. If desired, instead of two walls 35 and 37 (FIG. 3) a construction as shown in FIG. 5 may be chosen in which, to increase the reflecting power of the reflectors, four wall parts 45, 47, 49, 51 are used each having a curved shape (FIG. 5). The cylinder 3 which can be clamped with its lower end around the outside of the base 17 is locked against rotation relative to the base 17 by means of a stud 53 on said base which fits in a slot 55 of the cover 3. This stud ensures that the cover is always arranged in the same position as the base.

When using the above-described combination the fired flash lamps 7 can be removed. For that purpose, first the cover 3 with its reflectors must be removed. After having inserted a set of fresh lamps 7 in the bottom portion 1 the cover 3 can be provided in place again and the combination is again ready for use.

What is claimed is:

1. In a device which is attachable to a camera, and has a base part for holding a plurality of flash lamps to be flashed successively by ignition means including two ignition contacts on the camera as the device is rotated about its central axis, the improvement in combination therewith comprising:
    (a) a plurality of spaced socket means on the base, each socket means having an opening and including therein a pair of spaced resilient electrical contact plates between which a lamp stem is insertable,
    (b) an annular ring on the lower side of said base with both of each pair of contact plates having ends which extend to and about said ring, these ends being connectible sequentially to said ignition contacts of the camera,
    (c) a cover having transparent side walls and a top for enclosing the portion of the device holding the flash lamps and being removably secured to said base, and
    (d) panels fixedly disposed within the cover and formed integral therewith for defining chambers about the axis, each chamber corresponding to one flash lamp, with the outwardly facing walls of the panels being reflective for cooperating with said lamp.

2. A device as defined in claim 1 wherein the panels define four chambers.

3. A device as defined in claim 1 wherein each panel is a single sheet curved in the vicinity of its mid-point forming two sides at a generally right angle, each panel defining between its two sides one of said chambers.

References Cited

UNITED STATES PATENTS

| | | | |
|---|---|---|---|
| 3,309,513 | 3/1967 | Aymar | 240—1.3 |
| 3,327,105 | 6/1967 | Kottler et al. | 240—1.3 |
| 3,351,891 | 11/1967 | Schneck | 339—217 XR |
| 3,360,639 | 12/1967 | Waggershauser | 240—1.3 |

NORTON ANSHER, Primary Examiner

F. L. BRAUN, Assistant Examiner

U.S. Cl. X.R.

95—11